United States Patent [19]

Chiu et al.

[11] Patent Number: 4,539,689
[45] Date of Patent: Sep. 3, 1985

[54] FAST LEARN DIGITAL ADAPTIVE EQUALIZER

[75] Inventors: Ran F. Chiu, Miami; Philip F. Kromer, III, Coral Gables; Ming L. Kao, Miami; Henry H. Parrish, Miami Springs, all of Fla.

[73] Assignee: Racal Data Communications, Inc., Miami, Fla.

[21] Appl. No.: 532,155

[22] Filed: Sep. 14, 1983

Related U.S. Application Data

[63] Continuation of Ser. No. 335,638, Dec. 30, 1981, abandoned, which is a continuation of Ser. No. 164,361, Jun. 30, 1980, abandoned, which is a continuation of Ser. No. 900,265, Apr. 26, 1978, abandoned.

[51] Int. Cl.³ .............................................. H04B 3/04
[52] U.S. Cl. ........................................ 375/13; 375/15; 375/118; 455/229
[58] Field of Search .................... 375/11, 13, 15, 106, 375/111, 118; 455/227, 229

[56] References Cited

U.S. PATENT DOCUMENTS

| | | | |
|---|---|---|---|
| 3,614,623 | 10/1971 | McAuliffe | 375/11 |
| 3,935,535 | 1/1976 | Motley et al. | 375/11 |
| 3,962,637 | 6/1976 | Motley | 375/11 |
| 3,992,616 | 11/1976 | Acker | 333/18 |
| 4,004,226 | 1/1977 | Qureshi | 333/18 |
| 4,027,250 | 5/1977 | Lang | 375/11 |
| 4,035,625 | 1/1977 | Chiu et al. | 333/18 |
| 4,053,837 | 10/1977 | Ryan | 333/18 |
| 4,061,977 | 12/1977 | Motley | 333/18 |
| 4,061,978 | 12/1977 | Motley | 333/18 |

FOREIGN PATENT DOCUMENTS

| | | |
|---|---|---|
| 1157126 | 7/1969 | United Kingdom . |
| 1269747 | 4/1972 | United Kingdom . |
| 1402022 | 8/1975 | United Kingdom . |
| 1459465 | 12/1976 | United Kingdom . |
| 1459501 | 12/1976 | United Kingdom . |
| 1478709 | 7/1977 | United Kingdom . |
| 1503083 | 3/1978 | United Kingdom . |
| 1536044 | 12/1978 | United Kingdom . |

OTHER PUBLICATIONS

Zohar, The Solution of a Toeplitz Set of Linear Equations, Journal of Association of Computing Machinery, vol. 21, No. 2, Apr. 1971, pp. 272–276.

Farden, Solution of a Toeplitz Set of Linear Equations, IEEE Transactions on Antenna and Propagation, Nov. 1976, pp. 906–907.

Trench, An Algorithm for the Inversion of Finite Toeplitz Matrices, J. Soc. in Bo. Wt., Appl. Matel., vol. 12, No. 3, Sep. 1964.

Butler, Non Iterative Automatic Equalizer, IEEE Transactions on Communications, vol. COM-23, No. 6, Jun. 1975, pp. 621–632.

*Primary Examiner*—Michael A. Masinick
*Attorney, Agent, or Firm*—Jackson & Jones

[57] ABSTRACT

An automatic adaptive equalizer operative on a test pattern including a carrier-only period, clock-only period and a single test impulse. The equalizer employs a transversal filter under control of a microprocessor. Samples of in-phase and quadrature phase components of the received impulse response are cross correlated and autocorrelated to form elements of a complex matrix equation describing the optimum equalizer tap settings. The microprocessor performs a special interative operation utilizing elements of this equation to rapidly and exactly calculate the optimum initial settings for the tap constants. The clock-only portion of the test pattern is analyzed to accurately set a sampling clock to properly sample the received impulse so that matrix formation can be carried out within the duration of the received impulse. Initial equalization can be achieved in a time on the order of 30 milliseconds at a data rate of 9600 bits per second.

101 Claims, 13 Drawing Figures

FAST LEARN DIGITAL ADAPTIVE EQUALIZER

This is a continuation of application Ser. No. 335,638, filed Dec. 30, 1981, now abandoned, which is a continuation of application Ser. No. 164,361, filed June 30, 1980, now abandoned, which is a continuation of application Ser. No. 900,265 filed Apr. 26, 1978, now abandoned.

BACKGROUND OF THE INVENTION

The subject invention relates to data communication equalizers and more particularly to automatic adaptive equalizers utilized in high speed data modems. The equalization scheme of the subject invention is particularly adapted to implementation under microprocessor control and provides a method and apparatus for performing highly accurate, ultra-fast equalization by operation on the channel response to only a single transmitted test impulse.

The equalizer of the invention is particularly suited to high speed polling applications. In such applications, it is customary to rapidly successively address a number of remote stations, for example in different cities, from a central site. Transmission from each remote station involves a new transmission line such that equalization must be re-established each time a new remote site is polled. Therefore, it is highly desirable to shorten the equalization time as much as possible in order to increase data throughput.

Many prior art equalizers have been relatively slow to equalize when first connected to a new transmission line and have thus wasted valuable data throughput time. Typically, many time consuming incremental adjustments of the equalizer taps are required during analysis of a relatively long period of random data or a training pattern containing numerous test pulses.

One prior art system proposes to equalize on a single transmitted test pulse but actually requires a multiplicity of test pulses. This system is disclosed in the Bell System Technical Journal, Vol. 50, No. 6 pp. 1969-2041, in an article by Robert W. Chang titled "A New Equalizer Structure for Fast Start Up Digital Communications."

Another prior art system, disclosed in U.S. Pat. No. 3,962,637 issued to David Motley et al, achieves equalization during the duration of the response to two transmitted impulses utilizing a technique which approximates the well-known zero-forcing scheme and does not employ correlation of signal samples. Equalization in this system requires an extra impulse to adjust the phase of the line signal so that proper sampling will occur. Because this system uses a zero-forcing scheme and then only an approximation thereto, it will not work on a highly distorted line or when high precision is necessary. While the Motley system suggests itself for operation at 4800 bps, it is not suitable for operation at the much higher data rate of 9600 bps at which the equalizer of the subject invention can operate.

In IEEE Transactions On Communications, Vol. Com-23, No. 6, June 1975, P. Butler et al disclose a method permitting a direct solution of a matrix equation in real variables describing the settings of equalizer tap constants in a single sideband system. This technique does not equalize on a single impulse response, but rather uses a much longer training sequence to reach an estimation of reasonable accuracy than that proposed by the subject invention. Moreover, Butler et al. do not solve a complex variable matrix equation. Accordingly the approach does not achieve equalization in a double sideband system as does the subject invention.

SUMMARY OF THE INVENTION

It is therefore an object of the invention to provide a faster operating and more accurate equalizer for data transmission systems.

It is another object of the invention to provide a practical equalizer which requires analysis of only a single transmitted impulse to initially set the equalizer taps for a wide range of varying line distortions and data rates.

It is another object of the invention to provide an equalizer wherein the equalizer tap constants are calculated exactly, rather than by using approximations.

It is another object of the invention to achieve such an exact calculation by an iterative technique which is performed during the time when a transmitted impulse response is being received such that the equalizer tap constants are calculated and set during the interval between the end of the impulse time and the time when the first received data reaches the major tap of the equalizer.

It is another object of the invention to provide an equalizer which can achieve a precise initial setting within a very fast time, such as 30 milliseconds for a data rate of 9600 bps and 15-20 milliseconds for a data rate of 4800 bps.

According to the invention, these and other objects and advantages are achieved by analyzing a signal that is transmitted from a transmitter over a communication medium. That signal may include, for example, a single received impulse response. From the received signal, the apparatus forms in-phase and quadrature phase impulse response signals. The in-phase and quadrature phase impulse response signals may be in passband or baseband or other translated frequencies. Sampled values from these two impulse response signals are employed to define a complex matrix equation. One complex matrix of that equation has elements formed by the auto and the cross correlation of sampled values taken from the in-phase and quadrature impulse response signals. The equalizer of this invention solves the complex matrix equation thus formed and obtains the exact values for initial setting of all equalizer taps. The initial equalizer settings compensate fully and completely for distortion in the communication medium over which the training signal was transmitted. After initial setting with the equalizer apparatus of this invention, more conventional adaptive equalization occurs during receipt of data.

The apparatus of the invention has the major advantage of enabling precise equalization constant calculations from the samples in a in a minimal amount of time despite wide variations in the distortion induced by the medium over which the received impulse is transmitted. Utilizing the invention, an equalizer has been constructed which can achieve initial equalization in a time on the order of 30 milliseconds at a data rate of 9600 bits per second. This is nearly five times faster than equalization can be achieved by presently commercially available systems. In the preferred embodiment of the invention, equalization is performed in response to a single received impulse, and an important feature of the preferred apparatus is provision of a means to determine the optimum points at which to sample the impulse response prior to receiving it. While equalization is performed using in-phase and quadrature phase impulse response signals at baseband frequencies in the preferred embodiment, such signals may be derived at passband or other translated frequencies.

BRIEF DESCRIPTION OF THE DRAWINGS

The preferred embodiment and best mode presently contemplated for implementing the just summarized invention will now be described in detail in conjunction with the drawings of which.

DETAILED DESCRIPTION OF THE PREFERRED EMBODIMENT

Figure 1:
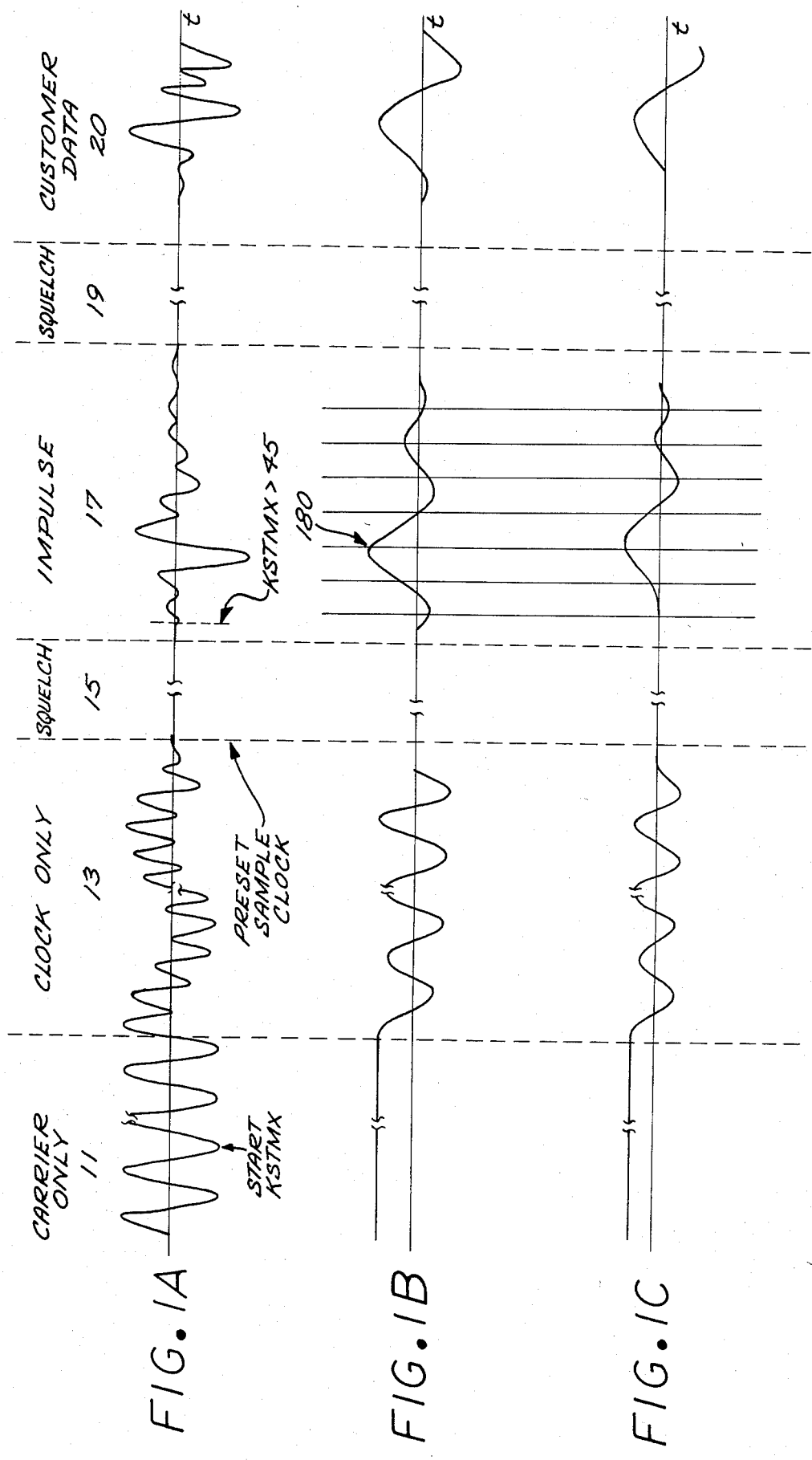
FIG. 1A illustrates the received signal utilized by the equalizer of the preferred embodiment.
FIGS. 1B and 1C illustrate two phase components in relative quadrature produced from the received signal on the same time scale as FIG. 1A.

The automatic adaptive equalizer of the invention may be conveniently introduced in conjunction with the training pattern waveform utilized to set up automatic gain control, timing and equalization, as shown in FIG. 1. The training pattern of FIG. 1 is the analog demodulated pattern at the receiver after transmission. The system of the preferred embodiment is particularly directed to the quadrature amplitude modulation (QAM) technique.

The training pattern includes in succession a number of bauds of carrier-only 11, a number of bauds of clock-only 13, a quiet or squelch period 15, a received impulse 17, and another squelch period 19. The training pattern may also include an optional fine tuning sequence before the transmission of customer data 20.

In the preferred embodiment, eight bauds of carrier-only 11 and seventeen bauds of clock-only 13 are sent. The squelch periods 15, 19 are twenty-seven and twenty-one bauds long, respectively, and the impulse period is one baud long when sent. Each baud period is 416.7 miliseconds. Of course, other baud periods could be utilized. Also, the length of the periods 11, 17, 15 and 19 depend on the maximum distortion. When the line distortion is less, fewer bauds are required for each one of them, especially for periods 17, 15 and 19, and the total time for tuning will be shorter. When the line distortion is severe, more bauds are required for each period, and the total tuning time will be longer.

During the carrier-only period 13 in FIG. 1, the initial incidence of carrier energy on the line is detected (carrier detect), starting system operation. When carrier detect occurs, a rough timing counter KSTMX is started, which ultimately anticipates the occurrence of the impulse response 17. KSTMX counts once per baud.

Automatic gain control is then performed on the carrier-only signal 11. After a fixed number of bauds of carrier-only 11 are detected, the system knows it is actually receiving a training pattern and can then expect the clock-only signal 13.

During the clock-only pattern 13, the apparatus examines the transmitted pattern to determine the optimum points to sample the forthcoming impulse response 17. The apparatus then sets up for the impulse response sampling procedure. The first step is to use the sampling point previously calculated to jump or preset the sampling clock to the optimum sampling position. It may thus be seen that the preferred embodiment actually samples the response to a transmitted impulse although other means for generating signals representative of such samples could be employed.

During the squelch period 15, the rough timing counter KSTMX, which was set-up upon detection of carrier-only, continues to count to subsequently indicate to the apparatus the point in time at which to start to sample the in-phase and quadrature phase impulse responses 17 (FIG. 1B, 1C). The samples are then taken, stored and correlated for forming a matrix. After the matrix is formed a special iterative technique is utilized to determine the precise initial equalizer tap settings, as discussed further below.

Figure 2:
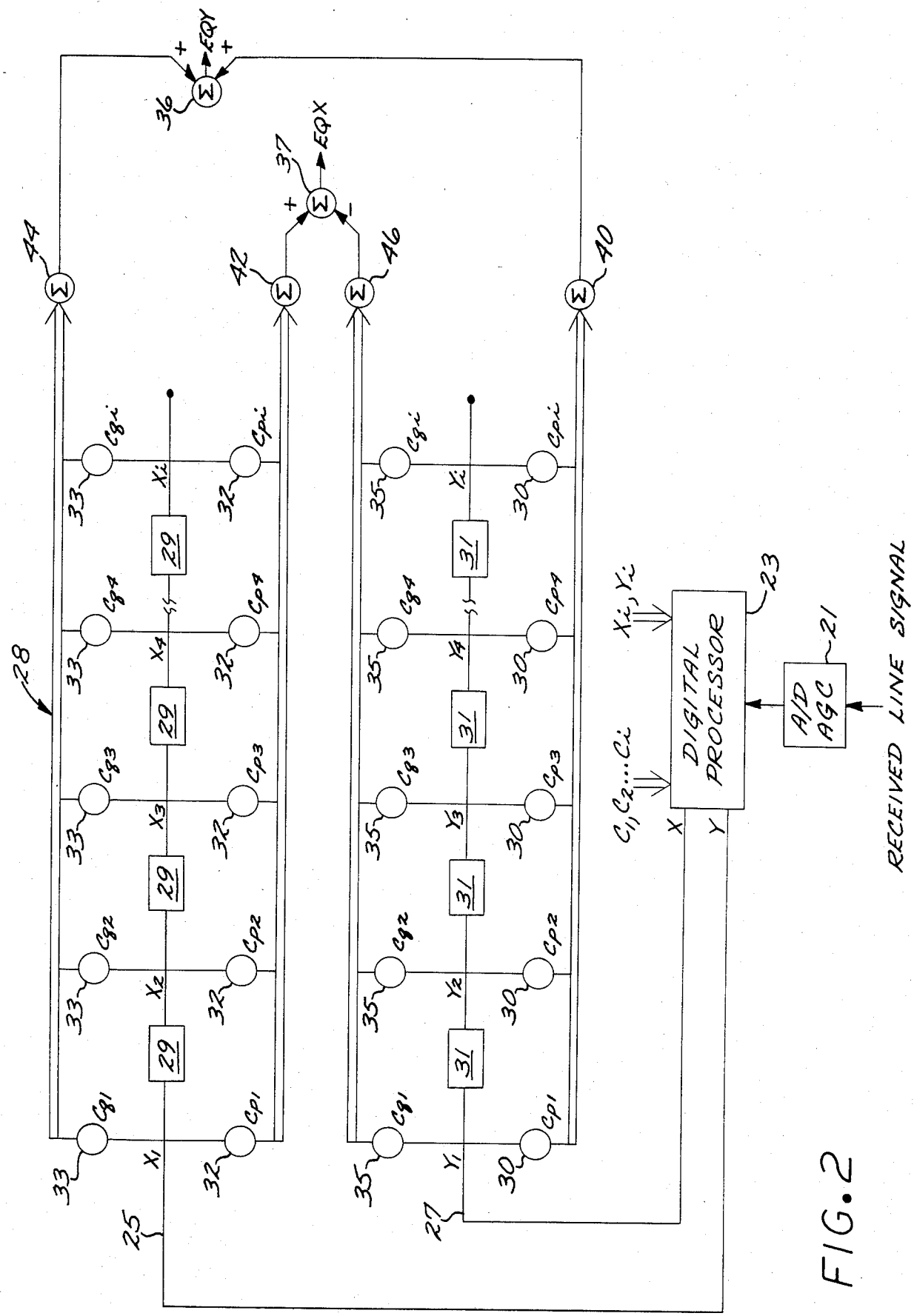
FIG. 2 is a schematic diagram useful in illustrating the structure and operation of the equalizer of the preferred embodiment.

The apparatus employed to perform these operations is illustrated conceptually in block form in FIG. 2. The apparatus includes an analog to digital (A/D) converter, an automatic gain control (AGC) section 21, a digital processor 23, and a transversal equalizer 28. The equalizer 28 is shown conceptually for purposes of illustration and is preferably implemented digitally, in which case it could also be shown as part of the digital processor 23.

Digital demodulation of the QAM signal into in-phase (X) and quadrature-phase (Y) baseband components, is preferably accomplished in the digital processor 23. The analog form of the demodulated in-phase and quadrature-phase baseband components is illustrated in FIGS. 1B and 1C, respectively. Demodulation again may be performed by well-known techniques and may optionally be performed by dedicated apparatus outside the digital processor 23. Neither the AGC or demodulation technique used form a part of the subject invention.

The X and Y phase components produced by demodulation represent samples in digital form of the baseband signal, the Y component sample being demodulated by a carrier 90° out of phase from the carrier demodulating the X component sample. In order to calculate the proper sampling time during the clock-only period, two samples per baud are taken in the preferred embodiment. After the optimum clock phase is set, the system takes one sample per baud.

These samples X, Y are sent to separate channels 25, 27 of the transversal equalizer 28. Each channel 25, 27 includes equally spaced digital delay elements 29, 31 and digital multipliers 30, 32, 33, 35 as known in the prior art. The multipliers 32, 33 multiply the delayed samples $X_m$ by constants $cp_i$ and $cq_i$ while the multipliers 30, 35 multiply the delayed samples $Y_m$ by constants $cp_i$ and $cq_i$. The "constants" just referred to are also called "coefficients" by some persons in the art. The outputs of each multiplier 30, 32, 33, 35 are summed by respective summers 40, 42, 44, 46 and fed to an adder 36. The output of one summer 46 is subtracted from that of the other 42 in a summer 37 to give the output data signal EQX. The outputs of the other two summers 40, 44 are summed by a summer 36 to give the output data signal EQY.

Figure 3:
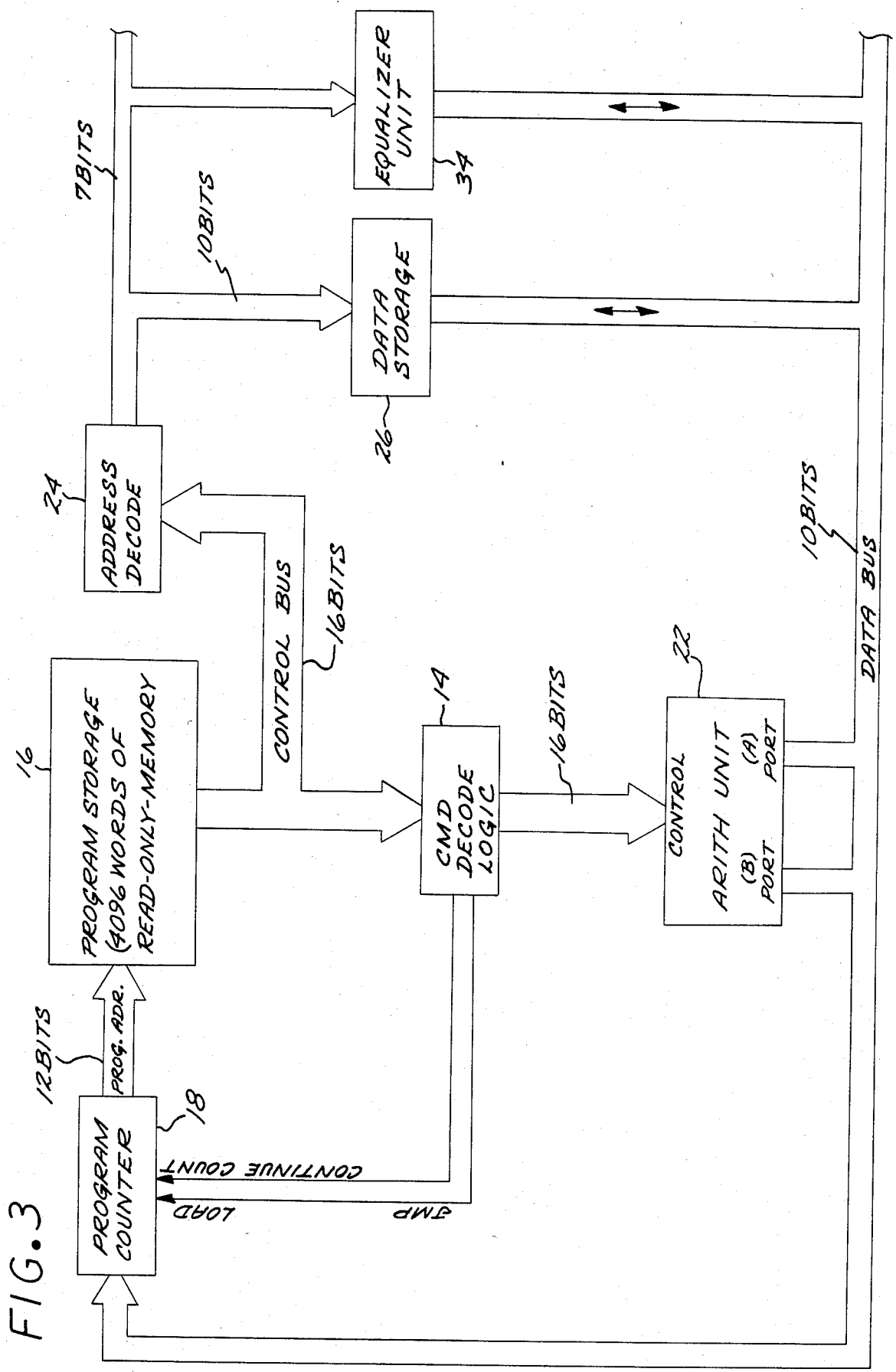
FIG. 3 is a schematic diagram illustrating the digital processor utilized in the preferred embodiment of the invention.

As shown in more detail in FIG. 3, the preferred embodiment of the invention includes a programmed microprocessor structure and an equalizer unit. The equalizer unit 34 includes the functions of the equalizer 28 of FIG. 2 and performs steady state adaptive equalization, for example as taught in U.S. Pat. No. 4,035,625 issued on July 12, 1977, assigned to the present assignee and incorporated by reference herein. In the preferred structure of the present invention, the equalizer unit 34 also contains some circuitry for accomplishing the initial equalizer setting, as will be further detailed below.

The microprocessor structure of FIG. 3 is conventional, and includes a program store 16, a program counter 18, for addressing the program store 16, a command decoder 14 for decoding instructions from the program store 16 to produce control signals and an arithmetic unit 22 for performing the instructions in response to the control signals from the decoder 14. The microprocessor structure also includes a data storage memory 26 and an address decoder 24 for addressing the memory. The program store 16 is a conventional read only memory (ROM) of sufficient capacity to store the instructions for performing the equalizer operations to be described below and may be constructed from four AMD 9216 ROM chips. The program counter 18 is a conventional counter which can be loaded or jumped as necessary in response to control signals from the command decoder 14. The arithmetic unit 22 is also conventional in structure and of sufficient power to carry out necessary operations as hereafter described. The data storage memory 26 includes storage for constants and 256 words of random access memory and may be configured from three AM91L12ADC RAM chips and one General Instrument R03-5120 chip. The random access storage is used to store incoming samples of the impulse response 17 and subsequent data 20 while calculations are underway.

The apparatus of FIG. 3 just described performs rapid initial equalization by calculating the initial equalizer tap multiplier constants in very rapid fashion. The manner of this calculation and the function and structure of the apparatus of FIG. 3 will now be explained in detail.

The multiplier constants to be calculated are labeled $c_{p1}, c_{p2}, c_{p3} \ldots c_{pi}$ and $c_{q1}, c_{q2}, c_{q3} \ldots c_{qi}$ (see FIG. 2). In complex form the equalizer tap constants may be expressed as:

$$c_i = c_{pi} + jc_{qi}, \; i = 1, 2, 3, \ldots n$$

To calculate the equalizer constants $c_i$ from the pair of demodulated impulse responses as shown in FIGS. 1B and 1C, the following definitions are adopted:

$$rT_o = \sum_{m=1}^{M} (X_m^2 + Y_m^2) \tag{1}$$

$$rT_1 = \sum_{m=1}^{M-1} (X_m X_{m+1} + Y_m Y_{m+1}) + \tag{2}$$

$$j \sum_{m=1}^{M-1} (X_m Y_{m+1} - Y_m X_{m+1})$$

$$rT_2 = \sum_{m=1}^{M-2} (X_m X_{m+2} + Y_m Y_{m+2}) + \tag{3}$$

$$j \sum_{m=1}^{M-2} (X_m Y_{m+2} - Y_m X_{m+2})$$

$$rT_{n-1} = \sum_{m=1}^{M-n+1} (X_m X_{m+n-1} + Y_m Y_{m+n-1}) + \tag{4}$$

$$j \sum_{m=1}^{M+n-1} (X_m Y_{m+n-1} - Y_m X_{m+n-1})$$

The following elements are defined:

$$h_k = \frac{X_{n-q-k} - jY_{n-q-k}}{rT_0} \tag{5}$$

$$k = 1, 2 \ldots n$$

$$r_i = \frac{rT_i}{rT_0} \tag{6}$$

$$i = 1, 2 \ldots n - 1$$

In the above equations (1)–(6), $X_m$ and $Y_m$ are the m-th sample of the in-phase and quadrature phase of the impulse response used for calculating the autocorrelation and cross correlation. Equations, (2), (3), (4) represent the auto-correlation and cross-correlation of the samples $X_m$ and $Y_m$.

In the above equations 1–6, M is the total number of samples used for calculating the auto-correlation and cross-correlation and n is equal to the number of taps, twenty for M and sixteen for n in the preferred embodiment, and q equals the subscript of the first sample actually used to calculate $h_k$. The variable q accounts for the fact that in the preferred embodiment not all samples taken are used, in other words n is less than M as later explained in detail. If n equals M, $q=1$.

With these definitions, the equations defining the optimum tap constants $c_1, c_2, \ldots c_n$ for an equalizer of n taps is written as follows in matrix form:

$$\begin{bmatrix} 1 & r^*_1 & r^*_2 & \cdots & r^*_{n-1} \\ r_1 & 1 & r^*_1 & \cdots & r^*_{n-2} \\ r_2 & r_1 & 1 & r^*_1 & \cdots & r^*_{n-3} \\ r_3 & r_2 & r_1 & 1 & r^*_1 & \cdots & r^*_{n-4} \\ \vdots & & & & & \vdots \\ & & & & & 1 & r^*_1 \\ r_{n-1} & \cdots & & & & r_1 & 1 \end{bmatrix} \begin{bmatrix} c_1 \\ c_2 \\ \vdots \\ \vdots \\ \vdots \\ c_n \end{bmatrix} = \begin{bmatrix} h_1 \\ h_2 \\ \vdots \\ \vdots \\ \vdots \\ h_n \end{bmatrix} \tag{7}$$

In equation (7), $r_1 \ldots r_i$ and $h_1 \ldots h_n$ are complex constants while $c_1 \ldots c_n$ are complex variables. The asterisk (*) indicates the complex conjugate form.

According to the invention, a special solution of this equation (7) permits a precise iterative calculation of the tap constants $c_1 \ldots c_i$ within the time interval required by the training scheme of FIG. 1 plus the time delay required for data to propagate between the input and output of the equalizer. According to this solution, the following definitions are made:

$$e_1 = 1 - |r_1|^2 \quad (8)$$

Where $|r_1|$ represents the magnitude of the complex quantity $r_1$;

$$s_1^{(1)} = -r_1 \quad (9)$$

Where superscript "(1)" indicates the first iteration $i=1$; and $$c_1^{(1)} = h_1 \quad (10)$$

Adapting these definitions, the exact iterative solution for the tap constants is as follows:

$$c_{i+1}^{(i+1)} = \left( h_{i+1} - \sum_{m=1}^{i} c_m^{(i)} r_{i-m+1} \right)(z_i) \quad (11)$$

$$s_{i+1}^{(i+1)} = - \left( r_{i+1} + \sum_{m=1}^{i} s_m^{(i)} r_{i-m+1} \right)(z_i) \quad (12)$$

$$c_j^{i+1} = c_j^{(i)} + c_{i+1}^{i+1} s_{i-j+1}^{*(i)} \quad 1 \leq j \leq i \quad (13)$$

$$s_j^{i+1} = s_j^{(i)} + s_{i+1}^{i+1} s_{i-j+1}^{*(i)} \quad 1 \leq j \leq i \quad (14)$$

$$e_{i+1} = e_i(1 - |s_{i+1}^{(i+1)}|2) \quad (15)$$

$$z_{i+1} = \frac{1}{e_{j+1}} . \quad (16)$$

The superscripts again indicate the value of the variable for a particular iteration. These equations 7–16 provide a simple means for rapidly and exactly calculating the tap constants $c_i$ in the complex matrix equation (7). This iterative technique enables the apparatus of the invention to calculate the constants $c_i$ and set the equalizer to achieve initial equalization during a total training time of approximately 30 milliseconds from the beginning of carrier-only to the first bit of customer data in a 2400 baud machine. Variations of the matrix equation (7) may be written and solved by the technique illustrated above without departing from the scope of this invention.

The structure and operation of the apparatus of FIG. 3, as it relates to the preferred embodiment of the invention, will now be described in further detail in conjunction with FIGS. 4–8.

Figure 4:
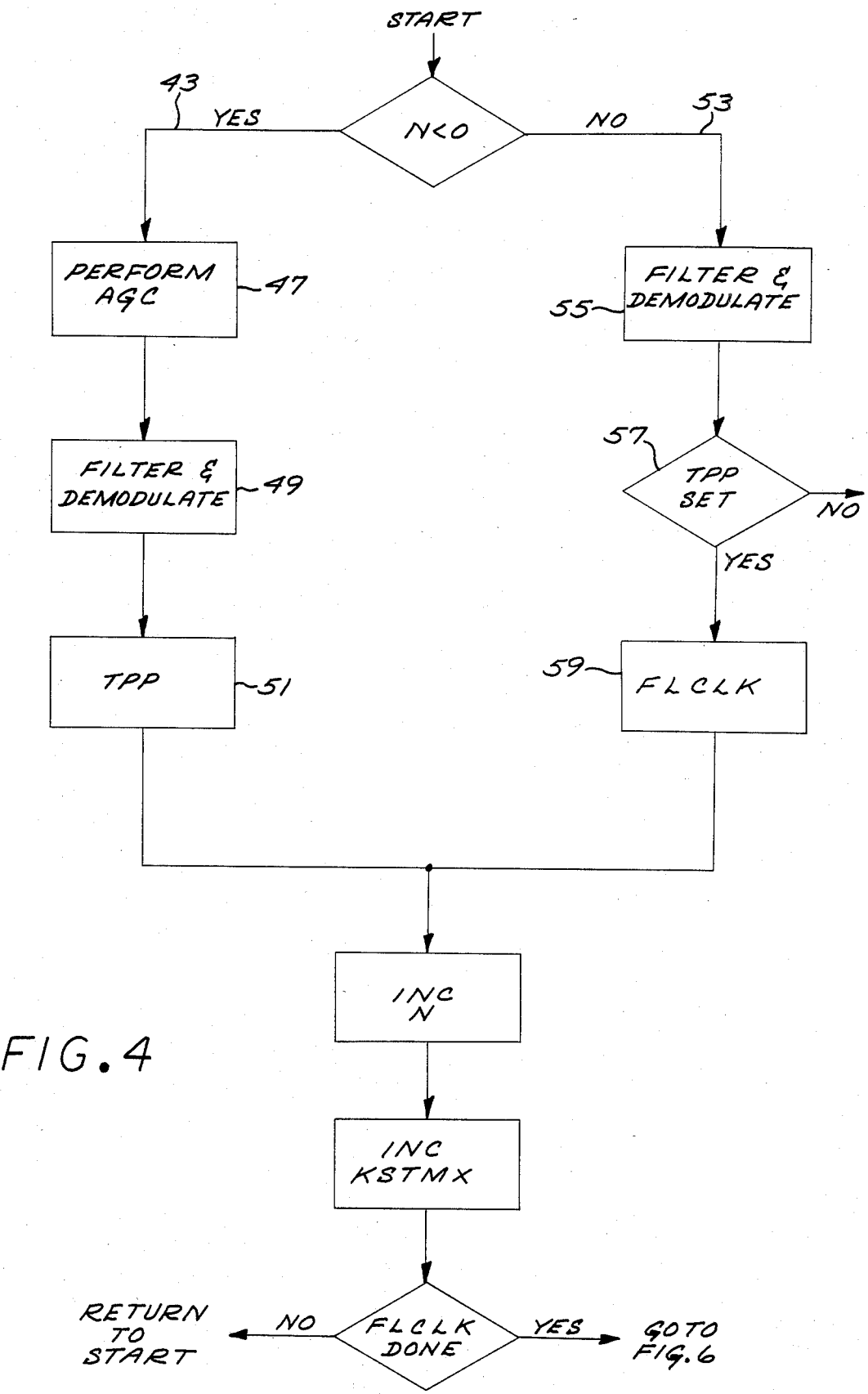
FIG. 4 is a flow diagram illustrating the overall structure and operation utilized to properly time the sampling of the received signal in the preferred embodiment.

After the carrier is detected and the clock KSTMX is started, the system operates according to the flow illustrated in the flow chart of FIG. 4. The flow of FIG. 4 illustrates accomplishment of the automatic gain control function, filter, demodulation, the detecting of the training pattern present (TPP) and calculation of the optimum sampling point to be used in the subsequent operations of FIG. 7. Two samples of the carrier-only signal are processed each baud for the eight bauds of carrier-only 11. A counter N is set up at −8 to direct operation.

As long as N is less than zero, the left branch 43 of the flow is followed and each sample is subjected to an automatic gain control operation 47, a filter and demodulation operation 49 and the test pattern present detection 51. The test pattern detection checks six successive bauds of carrier-only signal and thereafter sets a flag indicating that a test pattern is in fact being received. Each baud, the counter N is incremented by one, as is the counter KSTMX.

When N equals zero, the clock-only signal 13 begins. The AGC is frozen and the right hand branch 53 of the flow of FIG. 4 is entered. In this branch 53, a filter and demodulation operation 55 is performed and a test 57 of the TPP flag is made. Assuming TPP has been detected and the TPP flag set, the fast learn clock operation 59 is performed. During this operation, denoted FLCLK, the apparatus calculates the optimum sampling point for the forthcoming impulse based on the demodulated clock-only information. After each two samples per baud have been demodulated and used in the FLCLK process, the counter KSTMX is incremented by one, as is the N counter. When FLCLK is done, the flow proceeds to FIG. 7.

Figure 5:
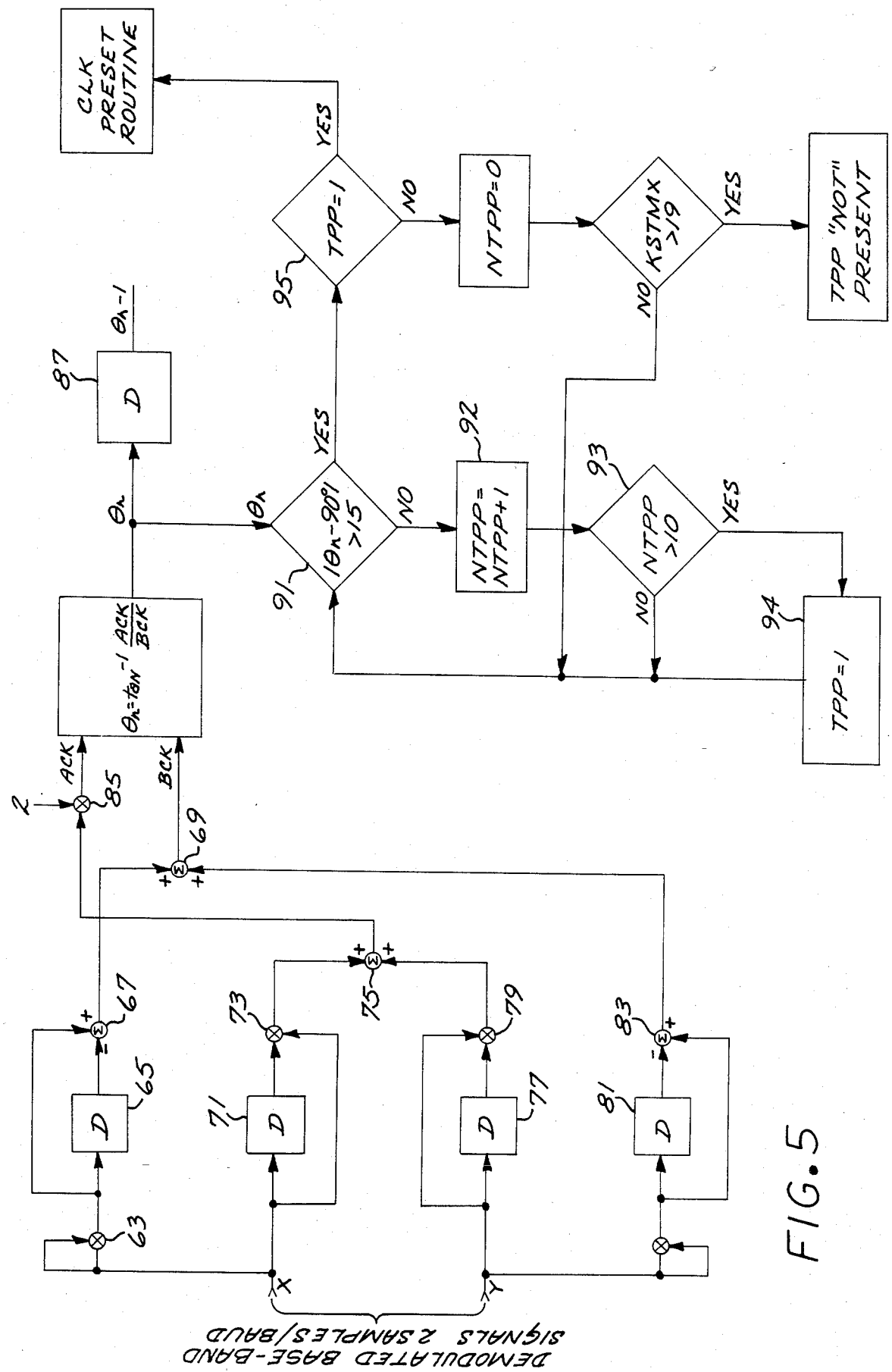
FIG. 5 is a detailed flow diagram illustrating the method and apparatus utilized to detect the presence of the received signal in the preferred embodiment.

The manner in which the training pattern detection is performed is illustrated in more detail in FIG. 5. Referring to FIG. 5, X and Y samples of the demodulated baseband signal are supplied to respective inputs at the rate of two samples per baud.

The samples presented to the X input are operated upon as follows. Each sample is first squared by a multiplier 63 and the output of the multiplier 63 is stored for one sample time in a delay element 65. The current output of the multiplier 63 is added to the negative value of the previous output of the multiplier 63 in an adder 67. The output of the adder 67 is supplied as one input to a second adder 69. The X input is also supplied to a second one sample time delay element 71. The output of the second one-sample delay element 71 is supplied to a second multiplier 73, also supplied with the X input, such that the current X input sample is multiplied by the immediately preceding X sample. The output of the second multiplier 73 is fed to one input of a third summer 75.

The Y input is similarly operated on. A delay element 77 delays the first sample of the Y input and a multiplier 79 multiplies the first sample of the Y input by the delayed sample for supply to the third summer 75. The Y input is also squared and the squared Y input value is supplied to a delay element 81. The delayed squared sample is subtracted from a present squared sample by a summer 83 whose output is supplied to the second summer 69.

The output of the third summer 75 is multiplied by two at a multiplier 85 to form an output denoted ACK. The output of the second summer 69 is denoted BCK. The arc tangent of ACK/BCK is then taken to determine the sampling angle $\theta_n$. The current value of $\theta_n$ is stored by a delay element 87. The stored value of $\theta_n$ is used in the clock preset to be subsequently discussed.

It is then determined whether $\theta_n$ is within bounds for each of a number of counts NTPP. When NTPP is greater than 10, five bauds of samples have been examined. Thus, if $|\theta_n - 90°|$ is less than 15 continuously for greater than 10 NTPP counts, it is confirmed that carrier has been received for 5 bauds, and the TPP flag is therefore set equal to 1. This operation is illustrated in FIG. 5 by proceeding through blocks 91, 92, 93, to block 94, TPP equals 1. Once $|\theta_n - 90°|$ is greater than 15° and TPP equals 1, the clock preset routine is entered.

In the event, however, that $|\theta_n-90°|$ is greater than 15° on any of the carrier-only samples operated on, the test block 95, $TPP=1$, will not be satisfied, and NTPP will be reset to zero. In such event, if KSTMX is greater than 19, indicating nineteen bauds have occurred without detecting TPP, TPP not present is indicated. Failure to detect TPP normally indicates line dropout.

Once the training pattern is detected, it is necessary to properly align the timing of the sampling of the received impulse response 17. The sampling points are calculated such that the equalizer can best minimize the output error. The structure and technique used in the preferred embodiment for performing the presetting of the sampling clock (FLCLK) is illustrated in detail in FIG. 6.

Figure 6:
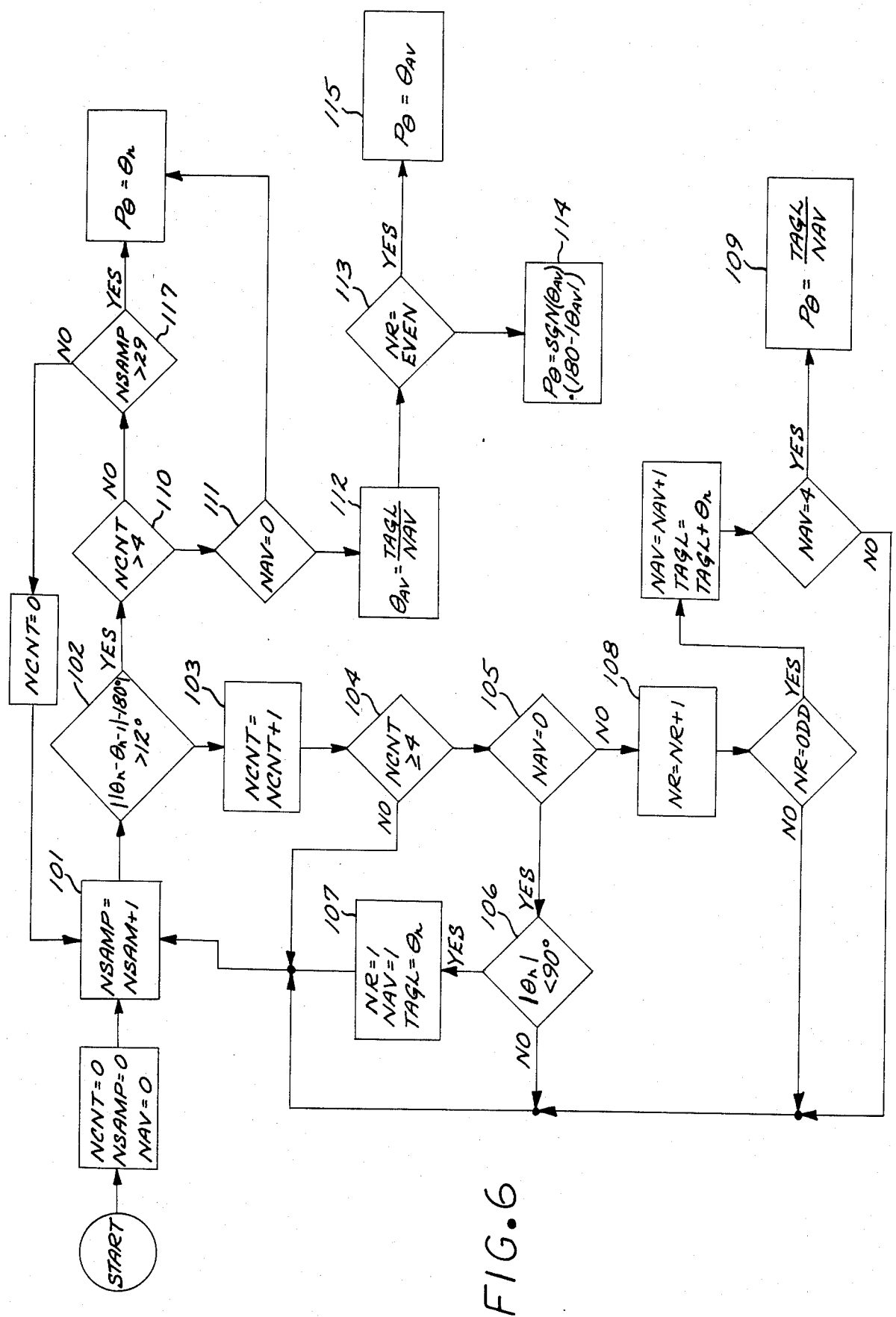
FIG. 6 is a detailed flow diagram illustrating the method and apparatus employed in the preferred embodiment to properly set the points for sampling the received signal.

Assuming no distortion or noise, the difference between successive angles $\theta_n$ should be 180°. Therefore, if the magnitude $$\phi=||\theta_n-\theta_{n-1}|-180°|$$

is less than 12° for several successive samples, the clock is in good range. Assuming that $\theta_n$ is in good range over several sampling intervals of the clock-only pattern, the loop including blocks 101, 102, 103, 104, 105, 106, and 107 in FIG. 6 is operative. Initially, three counters NCNT, NSAMP, and NAV are set to zero. When the first sample is tested, the sampling counter NSAMP is incremented by 1 as indicated by the block 101. The angle $\phi$ is then tested, and if it is within range, the counter NCNT is incremented by 1. After four consecutive good samples, the test, NCNT greater than or equal to four (Block 104), is satisfied, and $NAV=0$ is satisfied. In this event, the test indicated by block 106 is performed to ascertain whether the magnitude of $\theta_n$ is less than 90°. If so, a counter NR is set equal to 1. The counter NAV, representing the number to be averaged, is set equal to 1 and TAGL (total angle) is defined as equal to $\theta_n$ at this moment. The next time around the loop, the test $NAV=0$ is not true, and NR is incremented by one at block 108. NR+1 is then equal to two. NR is then not odd, and another sample is taken. After this sample, assuming $\phi$ is still in bounds, NR is odd (equal to 3). Therefore, the number averaged $NAV+1=2$ and TAGL is equal to the previous $\theta_n$ value plus the new $\theta_n$ value. Thus there are two angles to be averaged. Assuming that $\theta_n$ continues to be within bounds, the number of $\theta_n$ samples averaged is incremented to 4 and then the angle $P_\theta$ is determined at block 109 by calculating the quotient of TAGL and NAV. $P_\theta$ indicates the number of degrees from which the sampling point being used diverges from the optimum sampling point. Thus, it takes 10 angle differences within bounds to reach the block $P_\theta=TAGL/NAV$.

In the event, however, that distortion is occurring, other provisions are made for calculating $P_\theta$. For example, if it occurs that $\phi$ is greater than 12, satisfying block 102, a test 110 is made to determine if the number of good samples counted NCNT is greater than or equal to 4, i.e. whether four in-bounds angle tests have occurred. If so, a test 111 is made of the NAV counter to determine whether any samples TAGL have been stored for averaging. If any samples have been stored, the average $\theta_{av}=TAGL/NAVL$ is computed as indicated by the four blocks 112, 113, 114, 115. These four blocks indicate that $P_\theta$ is taken as equal to $\theta_{av}$ if NR is even, whereas $P_\theta$ is taken as equal to $$[SGN(\theta_{av})][180°-|\theta_{av}|]$$

if NR is odd. If, however, at the test 111, NAV is found to be equal to zero, indicating no samples $\theta_n$ have been accumulated, $P_\theta$ is taken to be the current sample $\theta_n$.

If the NCNT$\geq$4 test 110 is not satisfied, a test 117 of the number of samples, indicated by counter NSAMP, is made. If that number NSAMP is greater than 29 (>14 bauds), $P_\theta$ is again taken to be $\theta_n$. If NCNT$\geq$4 is not satisfied and NSAMP$\geq$29 is not satisfied, NCNT is set to zero and another sample is examined. This procedure assures that if the angle determination is initially or occasionally out of bounds, subsequent angles can be examined to average the clock according to the previously discussed procedures.

Figure 7:
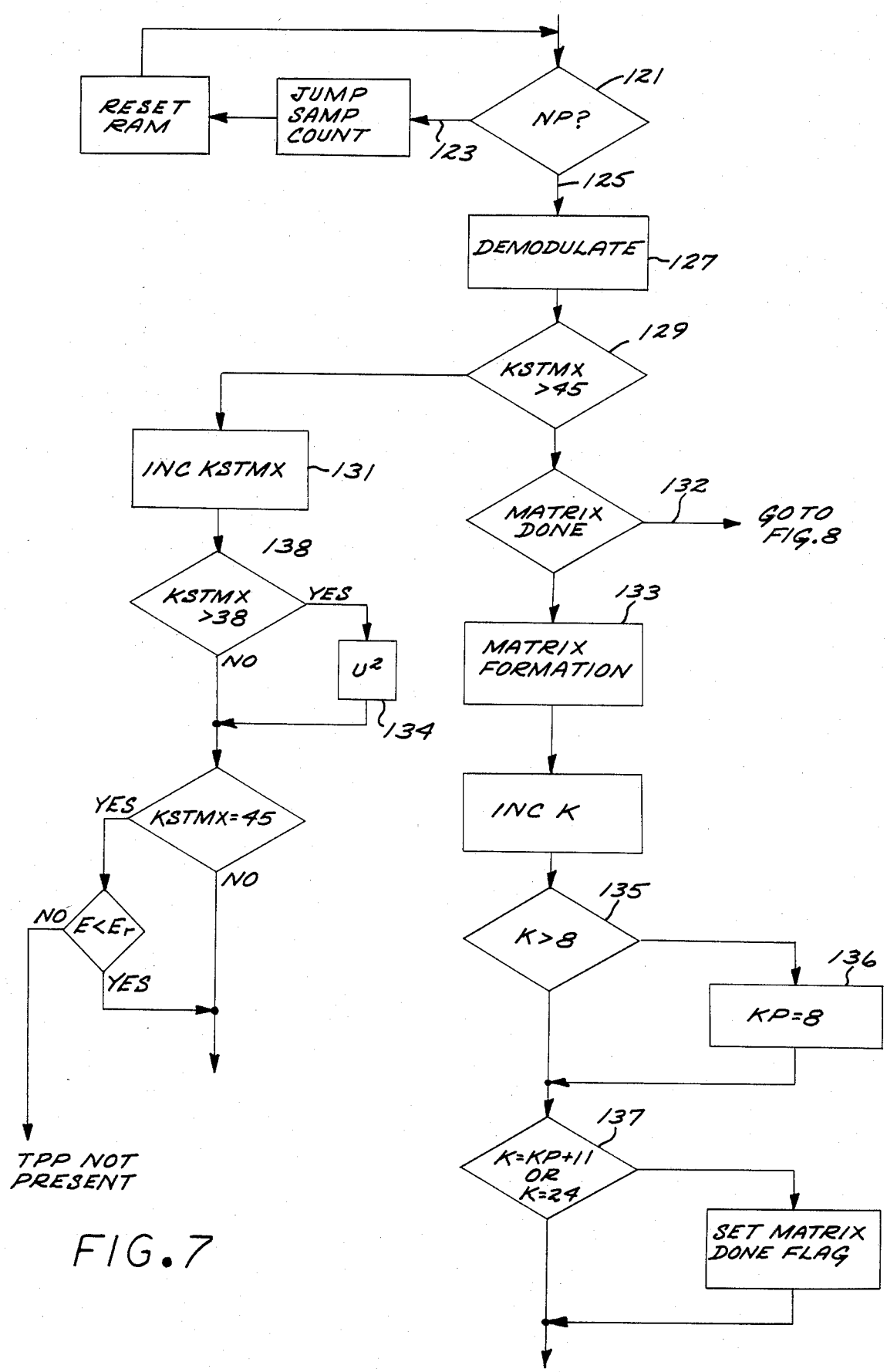
FIG. 7 is a detailed flow diagram illustrating the method and apparatus employed in the preferred embodiment to determine the equalizer tap constant settings from the samples of the received signal.

$P_\theta$ then determines the phase shift of the impulse sampling clock to be used in the matrix sampling operation illustrated in FIG. 7.

In FIG. 7, the first time through, the new program (NP) test 121 is positive and the left branch 123 of the flow is followed. Here the equalizer random access memory (RAM) 26 is reset. Also the optimum sampling point determined by FLCLK is used to jump the sampling clock to the optimum sampling position within each baud. The clock rate is reduced in half to 2400 Hz such that one sample per baud of the impulse response is taken from each of the X and Y channels.

The second time through the flow of FIG. 7, a second branch 125 is followed. Detected samples are demodulated (block 127), and then a test 129 is performed on KSTMX to see if it is greater than 45. If it is not, KSTMX is incremented (block 131). As soon as KSTMX is greater than 45, matrix formation 133 from the sampled impulse 17 begins.

The branch followed when KSTMX$\leq$45 includes a demodulated output energy test which assures that the system is receiving the equalizer test pattern and not customer data. After KSTMX is greater than 38 the energy is determined as denoted by blocks 134, 138. If the energy is below a set level $E_{ref}$, the squelch period is assumed to have been detected and the system knows a training pattern is present. If the energy is greater than $E_{ref}$, training pattern TPP not present is indicated. This provides a double check on the presence of a training pattern.

Sampling of the impulse wave form 17 is illustrated by the vertical lines in FIG. 1B and 1C. The number of samples is counted by a counter K, started when $KSTMX=45$. Each sample produces an X component $x_i$ and a Y component $y_i$. As the samples $x_i$, $y_i$ are successively taken, formation of the matrix equation (7) according to the definitional equations (1), (2), (3), (4) begins. For example, during the first baud, $x_1$ and $y_1$ are taken and stored in the RAM 25 and may then be used to calculate $x_1^2+y_1^2$, the first iteration of $rT_0$, equation (1). During the second and successive samples, iterations of $rT_0$ and the correlating equations $rT_1$, $rT_2$ . . . are calculated.

As the second sample $x_2$, $y_2$ is taken, it is stored in the RAM 26, and the square of its magnitude, $X_2^2+y_2^2$ is compared to the square of the first sample magnitude $x_1^2+y_1^2$ to determine which is larger. The larger is retained and compared to the square of the magnitude of the next sample to determine the largest sample and hence the peak 180 of the sampled impulse response 17.

The baud KP during which the peak 180 occurs is stored to be used in subsequent operations. All samples $x_i$, $y_i$ are also stored.

Sampling is terminated upon one of two conditions as indicated by a test 137 (FIG. 7). For the application of the preferred embodiment, it is advantageous to use eight samples before the peak and eleven after the peak. If eleven samples have occurred after the peak, $K=KP+11$, and matrix formation is terminated. If $K<8$, KP is set equal to eight (blocks 135, 136) so that at least nineteen samples must be taken before formation can be terminated upon $K=KP+11$. Otherwise, once twenty-four total samples have been taken, matrix formation is terminated and a flag is set.

Figure 8:
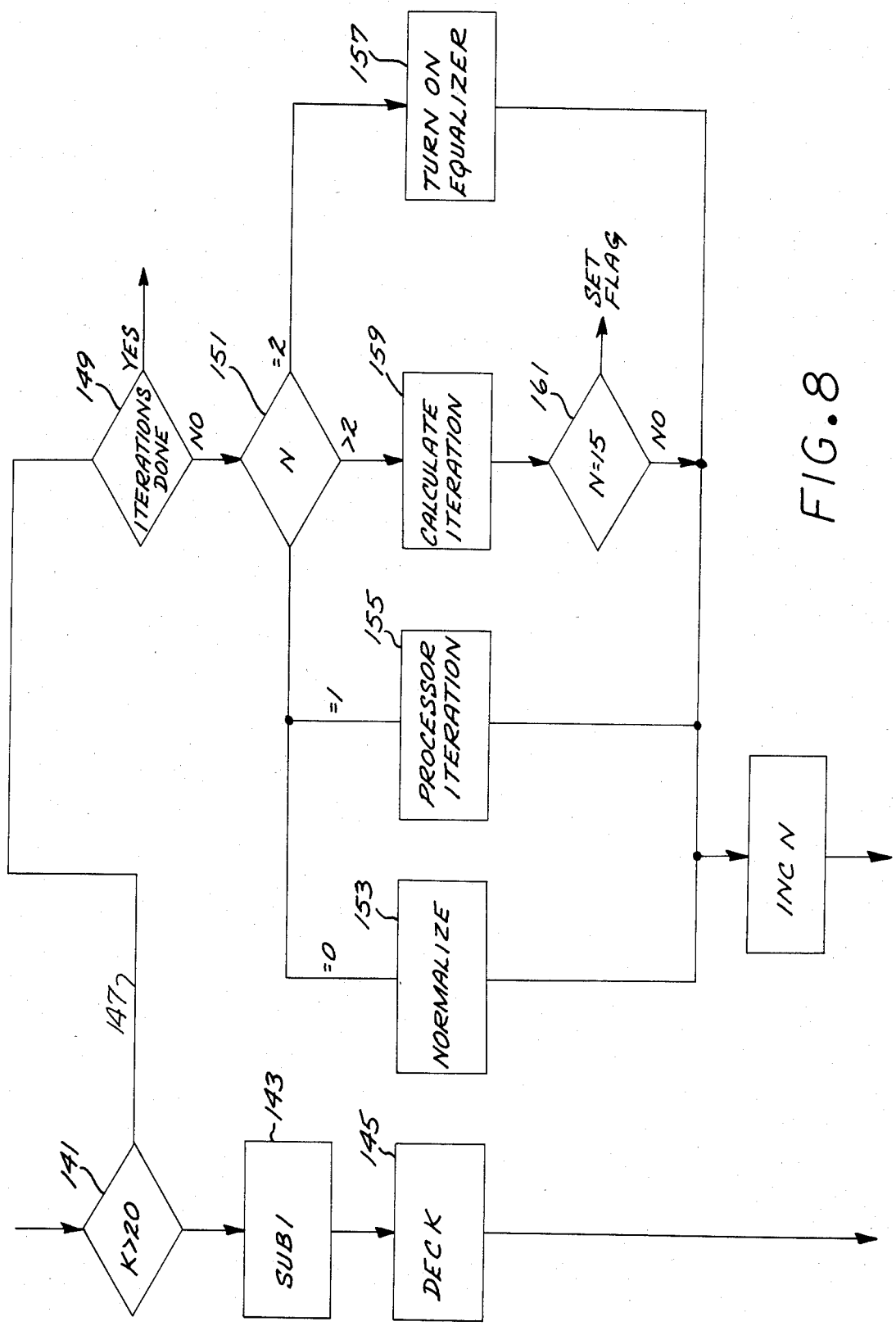
FIG. 8 is a continuation of the flow of FIG. 7.

Once the matrix flag is set, the next time through the flow, a branch 132 occurs to the test 141, $K>20$ (FIG. 8). If greater than 20 samples have been taken, the test 141 is satisfied, and the processor 23 proceeds to correct the effect on the matrix of taking too many samples.

Thus, $K>20$ indicates that, because of the rough alignment of the counter KSTMX, too many samples before the occurrence of the peak 18 have been taken. These samples will likely contribute to inaccuracies and their effect is subtracted by an operation 143 denoted SUB 1. This subtraction is accomplished by taking the first samples $x_1$, $y_1$ from memory, calculating their impact upon the values for the equations (1), (2), (3) for $rT_0$, $rT_1$, $rT_2$, etc. and subtracting that impact. After the effect of the first sample $x_1$, $y_1$ is subtracted the sample counter K is decremented by one (block 145) and the $K>20$ test 141 is again performed. If the test 141 is satisfied, the effect of the second sample pair $x_2$, $y_2$ is calculated and subtracted, etc. until $K \leq 20$. Once $K \leq 20$, the values determined by the remaining samples $x_1$, $y_i$ are utilized in the subsequent matrix calculations.

Once K is reduced to 20, a branch 147 occurs to the tap constant calculation process, equations (5)–(6) and (8)–(16), first passing through a test 149 to determine if the calculation has already been done. At the beginning of the calculation process, a counter N is set to zero. A test 151 of the value of N is then made.

The first step 153 in the calculation process, with N equal to zero, is a normalization process. During this step, the $r_i$'s and $h_k$'s of equations (4) and (5) are calculated by the microprocessor structure of FIG. 3.

The next time through branch 147, with N equal to 1 (block 155), the microprocessor develops the equalization constants $c_i$ by calculating successive iterations of the equations (11) (12) (13) (14) (15) (16), previously discussed.

With $N=2$, the microprocessor structure of FIG. 3 begins to interact with the equalizer unit 34 in the following manner. The microprocessor calculates equations (11) and (12) and then transfer the "r" matrix (equation 7) and other intermediate calculation results to the equalizer unit 34. In this manner, the microprocessor shifts part of the calculation responsibility to the equalizer unit 34 in order to free the processor to handle other operations on the incoming data. The equalizer unit 34 contains hard wired logic which performs or calculates the subsequent iterations of equations (11) through (14). For $N=2$, the equalizer only calculates equations (13) and (14). At the end of each calculation of an iteration of equations (11) through (14) in the equalizer unit 34, (13 and 14 only for $N=2$) the processor calculates the quantity $z_i+1$, equations (15) and (16), and returns that value to the equalizer 34 for performance of the next iteration of equations (11) through (14). This allocation of calculation between microprocessor and equalizer unit is merely due to a desire to efficiently utilize the apparatus. As is apparent, the assignment of the calculations of equations (11) through (14) to circuitry associated schematically with the equalizer unit 34 is one approach to calculating the instant equalizer settings. Other approaches such as utilization of a more powerful microprocessor to do all calculations could be implemented according to the subject invention.

When N is equal to 15, the matrix has been solved for the tap constants $c_k$ and the iteration done flag is set. When the final tap constants are calculated, the $h_k$'s are stored and the final equalizer constants $c_i$ determined according to the just described procedure are set.

The just discussed operation is sufficient to set 16 taps. If the line signal is of such a poor quality that additional taps are needed, a fine tuning procedure may be performed in which additional bauds of known two phase data are sent and the error difference detected and used to adjust the additional taps according to conventional procedures.

As is indicated in the above discussion, many modifications and adaptations of the preferred embodiment are possible without departing from the scope and spirit of the invention.

Figure 9:
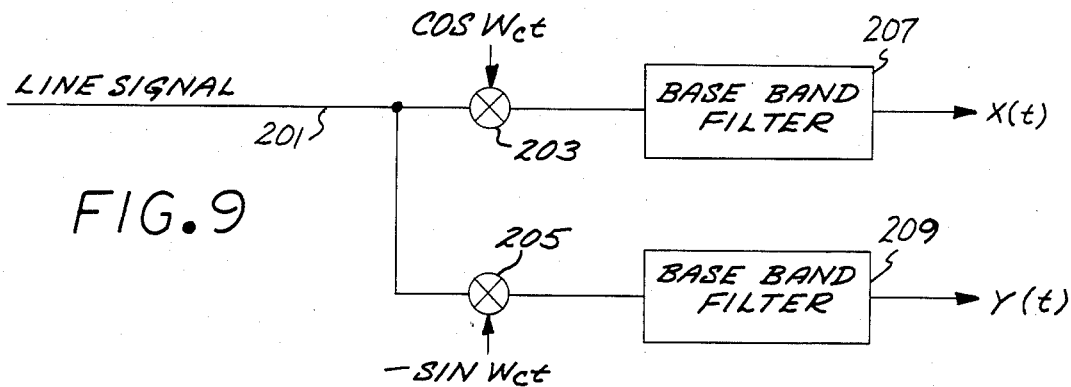
FIG. 9 illustrates one technique suitable for generating phase quadrature signals for use in the subject invention.
Figure 10:
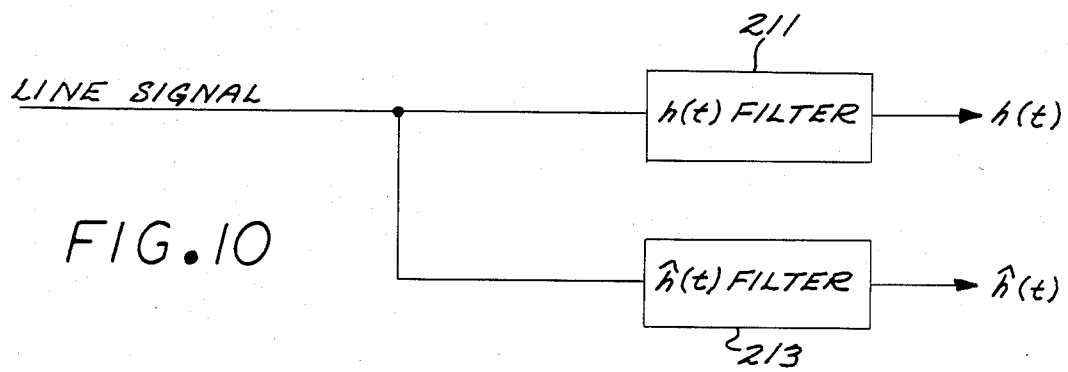
FIG. 10 illustrates an alternative technique for generating phase quadrature signals for use in the subject invention.
Figure 11:
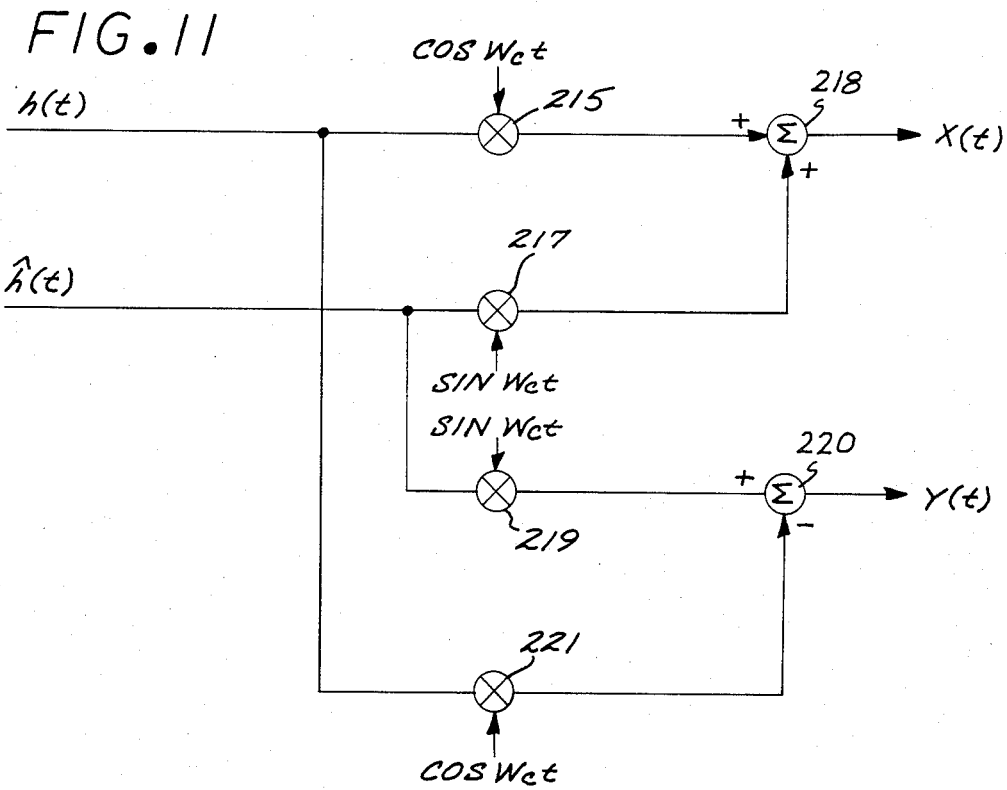
FIG. 11 illustrates an alternative technique for generating phase quadrature signals for use in the subject invention.

For example, as illustrated in FIGS. 9, 10, and 11 the in-phase and quadrature-phase signals used by the equalizer of the invention may be derived other than at baseband and in systems using various demodulation schemes.

FIG. 9 illustrates a simple quadrature demodulation technique wherein baseband signals x(t) and y(t) constitute the in-phase and quadrature-phase signals. In FIG. 9, the received signal on an input line 201 is fed to first and second mixers 203, 205 wherein the line signal is mixed with respective signals cos $\omega_c t$ and $-\sin \omega_c t$ where $\omega_c$ is the carrier frequency. The components are then filtered by respective baseband filters 207, 209 to yield the baseband quadrature components x(t) and y(t).

In FIG. 10, the received signal is fed to a first passband filter 211 having an impulse response h(t) and to a second passband filter 213 having an impulse response h(t), which is the Hilbert transform of the impulse response h(t) of the first filter 211. The respective outputs h(t), h(t) of the filters 211, 213 are at passband frequency and constitute in-phase and quadrature-phase signals which could be sampled by the equalizer of the subject invention.

In FIG. 11, an output h(t) of the filter 211 is fed to a first mixer 215 and to a fourth mixer 221. The output h(t) of the filter 213 is fed to a second mixer 217 and to a third mixer 219. The four mixers 215, 217, 219, 221 receive respective second inputs of cos $\omega_c t$, sin $\omega_c t$, cos $\omega_c t$, sin $\omega_c t$, where $\omega_c$ is the carrier frequency. The outputs of the first and second mixers 215, 217 are then summed by a summer 218 to give the demodulated baseband signal x(t). The output of the fourth mixer 221 is subtracted from the output of the third mixer 219 at a summer 220 to give the demodulated baseband signal y(t). In FIG. 11, x(t) and y(t) are in-phase and quadrature-phase signals which can also be sampled according to the invention to accomplish initial setting of the equalizer taps.

Therefore, it is to be understood that, within the scope of the appended claims, the invention may be practiced other than as specifically described herein.

What is claimed is:

1. In combination with an equalizer means adapted to receive a first signal transmitted across a distorting medium, said equalizer means having a plurality of taps settable for compensating for distortion in said first signal induced by said medium, the apparatus comprising:

means for generating a plurality of second signals representing samples of in-phase and quadrature-phase impulse response signals, said impulse response representing that of said distorting medium; and means operative upon said second signals to auto-correlate and cross-correlate said second signals, form elements of a matrix equation from the auto-correlated and cross-correlated said second signals, said elements including complex constants and complex variables, said variables defining the optimum initial setting for said taps, for iteratively calculating the exact values of said optimum initial settings utilizing said constants and for setting said taps to said exact values to produce a substantially distortion free signal.

2. The apparatus of claim 1 wherein said means for generating produces said second signals from the received first signal.

3. The apparatus of claim 1 wherein said received signal includes a training pattern waveform and wherein said means for generating includes:

means for forming said in-phase and quadrature-phase impulse response signals from said received signal and for sampling the in-phase and quadrature-phase impulse response signals at successive points to produce said second signals; and means for setting the successive points at which to sample the received first signal in response to said training pattern waveform.

4. The apparatus of claim 3 wherein the portion of the received first signal utilized to produce said second signals is a single received impulse response.

5. The apparatus of claim 4 wherein said received signal is quadrature amplitude modulated.

6. The apparatus of claim 1 wherein the received signal includes the response to a single transmitted impulse and said second signals are produced by sampling in-phase and quadrature-phase components of said response.

7. The apparatus of claim 1 wherein said in phase and quadrature phase impulse response signals are derived in a duration substantially equal to that necessary to provide sufficient samples for calculating said values from a single received impulse.

8. The apparatus of claim 6 further including means for detecting the said second signal closest to the peak of said impulse response and for subtracting the effect of particular said second signals on said elements based upon said location.

9. The apparatus of claim 6 wherein said received signal further includes a training waveform and wherein said apparatus further includes:

means for detecting the presence of said training waveform; and means responsive upon detection of said training waveform to control the sampling points of said impulse response.

10. The apparatus of claim 9 wherein said detecting means comprise:

means for forming an arc tangent from the samples produced by said sampling during transmission of said training waveform; and means for testing successive values of said arc tangent to confirm that said training waveform is present.

11. The apparatus of claim 10 wherein said training waveform includes a carrier-only period and wherein said arc tangent forming means operates on samples taken during said carrier-only period.

12. The apparatus of claim 9 wherein said sampling control means comprises:

a sampling clock;

means for determining the phase angle error of said clock from the samples produced by said sampling during transmission of said training waveform; and means for adjusting the phase of said clock to compensate for said error.

13. The apparatus of claim 12 wherein said means for determining said phase angle error tests successive arc tangents generated from successive samples produced by said sampling.

14. The apparatus of claim 13 wherein said testing determines whether said arc tangent is in a defined range for a plurality of intervals of a clock-only signal.

15. The apparatus of claim 14 wherein successive arc tangents are averaged to determine said phase angle error if said arc tangent is determined to be within said defined range for said plurality of intervals.

16. The apparatus of claim 14 further including means for determining the phase angle error if said arc tangent is not within said defined range for said plurality of intervals.

17. Apparatus adapted for use as an equalizer comprising:

first means for connection to a communication channel said first means including a plurality of taps settable for compensating for distortion in said channel; and second means for producing a plurality of successive samples of signals representing in-phase and quadrature-phase components of the impulse response of said channel and for operating upon said samples to form elements of a matrix equation from said samples, to iteratively calculate the exact values of the optimum settings for said taps utilizing said elements, and to set said taps to said optimum values, wherein said samples are both auto-correlated and cross-correlated and wherein said matrix equation includes complex constants and complex variables.

18. Apparatus adapted for use as an equalizer comprising:

a first means for connecting to a communication channel, said first means including a plurality of taps settable for compensating for distortions in said channel; and second means for producing a plurality of successive samples of first and second signals representing the impulse response of said channel and for operating upon said samples to form elements of a matrix equation from said samples, to iteratively calculate the exact values of the optimum settings for said taps utilizing said elements, and to set said taps to said optimum values, wherein said successive samples are derived from a received test impulse and wherein said exact values are calculated in a time less than the duration of said received test impulse.

19. An equalizer for equalizing to a training waveform and received impulse response comprising:
   means for connecting to a communication channel and having a plurality of taps settable for compensating for distortion in said channel;
   means for detecting the presence of said training waveform and for initiating a sampling count;
   means for adjusting said sampling count in response to said training waveform;
   means for forming in-phase and quadrature-phase impulse response signals from said received impulse response;
   means for sampling said in-phase and quadrature-phase signals in accordance with the adjusted sampling count to produce a plurality of samples;
   means for storing said samples;
   means for correlating said samples;
   means for utilizing said correlated samples in a set iterative calculations to obtain the exact values of the optimum setting for said taps; and
   means for setting said taps to said optimum values.

20. In an equalizer employing a clock means for successively sampling signals received by said equalizer, apparatus for correcting the phase error of said clock comprising:
   means for producing a succession of arc tangents from successive samples taken;
   means for utilizing a plurality of said arc tangents to compute said phase error; and
   means for adjusting the phase of said clock to correct for said phase error.

21. The clock correction apparatus of claim 20 wherein said means for computing includes means for establishing that said arc tangent is within a defined range for a plurality of sampling intervals and responsive to said establishing for averaging the arc tangent values determined to be within bounds to yield said phase error.

22. The apparatus of claim 21 wherein said computing means operates only during reception of a clock-only signal.

23. In an equalizer supplied with a training waveform including a carrier-only signal, and including means for sampling said training waveform, apparatus for detecting the carrier-only signal comprising:
   means for providing a succession of arc tangents from the samples derived during said carrier-only signal; and
   means for testing said arc tangents to determine that a carrier-only signal is present.

24. The equalization apparatus comprising:
   means for receiving signals transmitted across a distorting medium and having a plurality of tap coefficients settable for compensating for distortion in said signals induced by said medium;
   means responsive to a training signal containing therein the response of said medium to only one transmitted impulse for sampling said response to produce a plurality of impulse response samples;
   means operative upon said impulse response samples to auto-correlate and cross-correlate said samples, form elements of a matrix equation from the auto-correlated and cross-correlated samples, said elements including complex constants and complex variables, said variables defining the optimum initial settings for said tap coefficients, for iteratively calculating the exact values of said optimum initial settings utilizing said constants, and for setting said tap coefficients to said exact values to substantially remove said distortion.

25. In a data communication system, the process for achieving initial adjustment of an equalizer in a receiver adapted to receive a signal containing distortion comprising:
   providing said receiver with an initial training waveform including the response to only one transmitted impulse;
   sampling the impulse response to produce a plurality of impulse response samples;
   deriving the exact initial settings for the tap coefficients of said equalizer from said samples; and
   setting the coefficients of said equalizer to said values to substantially eliminate said distortion.

26. In combination with an equalizer means adapted to receive a first signal transmitted across a distorting medium, said equalizer means having a plurality of taps settable for compensating for distortion in said first signal induced by said medium, the apparatus comprising:
   means for generating a plurality of second signals representing samples of in-phase and quadrature-phase impulse response signals, said impulse response representing that of said distorting medium; and
   means operative upon said second signals to auto-correlate and cross-correlate said second signals, form elements of a matrix equation from the auto-correlated and cross-correlated said second signals, said elements including complex constants and complex variables, said variables defining the optimum initial settings for said taps, for iteratively calculating the exact values of said optimum initial settings utilizing said constants in N iterations for an $N \times N$ matrix and for setting said taps to said exact values to produce a substantially distortion free signal.

27. In combination with an equalizer means adapted to receive a first signal transmitted across a distorting medium, said equalizer means having a plurality of taps settable for compensating for distortion in said first signal induced by said medium, the apparatus comprising:
   means for generating a plurality of second signals representing samples of in-phase and quadrature-phase impulse response signals, said impulse response representing that of said distorting medium; and
   means operative upon said second signals to auto-correlate and cross-correlate said second signals, form elements of a matrix equation from the auto-correlated and cross-correlated said second signals, said elements including complex constants and complex variables, said variables defining the optimum initial settings for said taps, for iteratively and nonconvergently calculating the exact values of said optimum initial settings utilizing said constants and for setting said taps to said exact values to produce a substantially distortion free signal.

28. In a data modem receiver supplied with a received signal including a carrier-only signal, apparatus for detecting the carrier-only signal comprising:
   means for deriving a series of angles from the received signal;
   means for forming a plurality of difference values from a series of angles derived from the carrier-only signal by said means for deriving; and means for testing said difference values to determine whether a plurality of said difference values are within a selected first range and for producing a signal indicating said carrier signal is present upon detection of a selected number of said difference values being in range.

29. The apparatus of claim 28 wherein said difference values are formed by subtracting each angle derived from the carrier-only signal from 90°.

30. The apparatus of claim 29 wherein said first range is 0° to 15°.

31. The apparatus of claim 28 wherein said testing means is further operative to detect the number of angles outside of said first range and, after a first selected number of angles have been tested and a second selected number are detected outside of said first range, to produce a signal indicating carrier-only is not present.

32. The apparatus of claim 28 wherein said means for deriving is further operative to produce two in-phase samples and two quadrature samples per baud and to utilize said in-phase and quadrature samples to derive said angles.

33. The apparatus of claim 32 wherein said means for deriving derives said angles by evaluating the inverse trigonometric function of an argument which is the quotient of two quantities formed from said samples.

34. The apparatus of claim 33 wherein the inverse trigonometric function is:

$$\theta_n = \tan^{-1} \frac{2(X_n X_{n-1} + Y_n Y_{n-1})}{(X_n^2 - X_{n-1}^2) + (Y_n^2 - Y_{n-1}^2)}$$

where $\theta_n$ is the derived angle, $X_n$ is an in-phase sample taken at time "n", $Y_n$ is a quadrature phase sample taken at time "n" and "n−1" indicates the samples taken at the sample time immediately preceding sampling time "n."

35. The apparatus of claim 28 wherein said means for deriving includes means for sampling the received signal and wherein said apparatus further includes:
means operative after termination of the carrier-only signal for forming the difference between a plurality of pairs of said angles; and
means for testing a plurality of said differences to ascertain whether each tested difference is within a selected second range and responsive to said testing to produce a correction value for adjusting the timing of said sampling signal.

36. The apparatus of claim 35 wherein selected said differences are averaged by said testing means to produce said correction value.

37. The apparatus of claims 35 wherein, if testing of said differences indicate the sampling signal is not within the selected second range, said testing means performs a plurality of further tests to establish said correction value.

38. The apparatus of claim 37 wherein if said testing means detects a first condition wherein a first selected number of differences lies within said second range and at least one lies outside of said second range, said correction value is set equal to a first average of a second selected number of differences within said second range.

39. The apparatus of claim 38 wherein, under said first condition, said testing means alternatively may set said correction value to the value of the sign of a second average of a number of said differences within range multiplied by the difference between a constant and the magnitide of said second average.

40. The apparatus of claim 39 wherein said testing means is responsive to a second condition to set said correction value equal to the latest calculated said difference.

41. The apparatus of claim 35 wherein said means for deriving is further operative to produce two in-phase samples and two quadrature samples per baud and to utilize said in-phase and quadrature samples to derive said angles.

42. The apparatus of claim 41 wherein said means for deriving derives said angles by evaluating the inverse trigonometric function of an argument which is the quotient of two quantities formed from said samples.

43. The apparatus of claim 42 wherein the inverse trigonometric function is:

$$\theta_n = \tan^{-1} \frac{2(X_n X_{n-1} + Y_n Y_{n-1})}{(X_n^2 - X_{n-1}^2) + (Y_n^2 - Y_{n-1}^2)}$$

where $\theta_n$ is the derived angle, $X_n$ is an in-phase sample taken at time "n", $Y_n$ is a quadrature phase sample taken at time "n" and "n−1" indicates the samples taken at the sample time immediately preceding sampling time "n."

44. The apparatus of claim 35 wherein said pairs of angles are derived from a received clock-only signal.

45. The apparatus of claim 35 wherein said apparatus is applied in initial start-up of the receiver to achieve precise sampling of a transmitted impulse.

46. The apparatus of claim 45 wherein samples produced by said means for sampling are supplied to calculating means and used by said calculating means to calculate coefficients for exactly compensating for distortion in the data channel.

47. The apparatus of claim 46 wherein said calculating means calculates said coefficients by a non-convergent, iterative process.

48. The apparatus of claim 46 wherein said samples are used by said calculating means to form elements of an N X N matrix and said calculations are performed by said calculating means in N iterations.

49. The apparatus of claim 48 wherein in-phase and quadrature samples are used by said calculating means to form said elements.

50. The apparatus of claim 49 wherein said means for deriving is further operative to produce two in-phase samples and two quadrature samples per baud and to utilize said in-phase and quadrature samples to derive said angles.

51. The apparatus of claim 50 wherein said means for deriving derives said angles by evaluating the inverse trigonometric function of an argument which is the quotient of two quantities formed from said samples.

52. The apparatus of claim 51 wherein the inverse trigonometric function is:

$$\theta_n = \tan^{-1} \frac{2(X_n X_{n-1} + Y_n Y_{n-1})}{(X_n^2 - X_{n-1}^2) + (Y_n^2 - Y_{n-1}^2)}$$

where $\theta_n$ is the derived angle, $X_n$ is an in-phase sample taken at time "n", $Y_n$ is a quadrature phase sample taken at time "n" and "n−1" indicates the samples taken at the sample time immediately preceding sampling time "n."

53. A method for achieving initial start-up of a data modem receiver including the steps of:
sending a training pattern including a carrier-only signal;
deriving a series of angles from a received form of said carrier-only signal;
forming a first set of difference values using said angles;
testing a plurality of said difference values to determine whether a first selected number of said difference values are within a first selected range; and
producing a signal indicating said carrier-only signal is present upon detection of said first selected number of difference values in range.

54. The method of claim 53 wherein said difference values of said first set are formed by subtracting each angle from 90°.

55. The method of claim 53 wherein said step of deriving a series of angles further includes the step of producing two in-phase and two quadrature phase samples per baud from the received signal.

56. The method of claim 55 wherein said step of deriving further includes utilizing the in-phase and quadrature samples to calculate an inverse trigonometric function.

57. The method of claim 56 wherein said inverse trigonometric function is:

$$\theta_n = \tan^{-1} \frac{2(X_n X_{n-1} + Y_n Y_{n-1})}{(X_n^2 - X_{n-1}^2) + (Y_n^2 - Y_{n-1}^2)}$$

where $\theta_n$ is the derived angle, $X_n$ is an in-phase sample taken at time "n", $Y_n$ is a quadrature phase sample taken at time "n" and "n−1" indicates the samples taken at the sample time immediately preceding sampling time "n."

58. The method of claim 53 further including the steps of:
detecting the number of said difference values of said first set which are not within the first selected range; and
producing a signal indicating carrier-only is not present after detecting a first selected number of values not within said first selected range.

59. The method of claim 58 wherein the carrier-only not present signal is not produced until a second selected number of difference values of said first set have been tested.

60. The method of claim 53 further including the steps of:
producing a plurality of samples of a form of the received signal after detection of said carrier-only signal, said samples being produced by a sampling signal whose timing is adjustable in accordance with a correction value;
forming a plurality of angles from said samples;
forming a second set of difference values, each difference value of said second set comprising the difference between a respective pair of said angles;
testing a plurality of said second set of difference values to ascertain whether each tested difference value is within a second selected range; and
producing a correction value for adjusting said sampling signal in response to the results of said testing.

61. The method of claim 60 wherein said correction value is produced by averaging a plurality of said difference values of said second set.

62. The method of claim 60 wherein said step of deriving a series of angles further includes the step of producing two in-phase and two quadrature phase samples per baud from the received signal.

63. The method of claim 62 wherein said steps of deriving further includes utilizing the in-phase and quadrature samples to calculate an inverse trigonometric function.

64. The method of claim 63 wherein said inverse trigonometric function is:

$$\theta_n = \tan^{-1} \frac{2(X_n X_{n-1} + Y_n Y_{n-1})}{(X_n^2 - X_{n-1}^2) + (Y_n^2 - Y_{n-1}^2)}$$

where $\theta_n$ is the derived angle, $X_n$ is an in-phase sample taken at time "n", $Y_n$ is a quadrature phase sample taken at time "n" and "n−1" indicates the sample taken at the sample time immediately preceding sampling time "n."

65. The method of claim 60 wherein, if one of said tested difference values of said second set is outside of said second range and a plurality of said tested difference values of said second set are within said second range, said correction value is produced by averaging a number of said difference values of said second set within said second range.

66. The method of claim 65 wherein the correction value is set equal to the latest calculated said difference value in said second set.

67. The method of claim 60 further including the steps of:
applying said correction value to adjust said sampling signal;
sampling a received impulse response with the adjusted sampling signal; and
calculated equalizer coefficients from said samples to compensate for distortion in the data channel.

68. The method of claim 67 wherein said step of calculating includes the step of:
calculating elements of an N X N matrix from said samples;
calculating the exact values of said coefficients using said elements in an iterative process of N iterations.

69. The method of claim 68 wherein said iterative process is nonconvergent.

70. The method of claim 68 or 69 wherein said samples include both in-phase and quadrature samples.

71. The method of claim 67 wherein said step of deriving a series of angles further includes the step of producing two in-phase and two quadrature phase samples per baud from the received signal.

72. The method of claim 71 wherein said step of deriving further includes utilizing the in-phase and quadrature samples to calculate an inverse trigonometric function.

73. The method of claim 72 wherein said inverse trigonometric function is:

$$\theta_n = \tan^{-1} \frac{2(X_n X_{n-1} + Y_n Y_{n-1})}{(X_n^2 - X_{n-1}^2) + (Y_n^2 - Y_{n-1}^2)}$$

where $\theta_n$ is the derived angle, $X_n$ is an in-phase sample taken at time "n", $Y_n$ is a quadrature phase sample taken at time "n" and "n−1" indicates the sample taken at the same time immediately preceding sample time "n."

74. In a data modem, apparatus for use in adjusting the timing of a sampling signal used to form samples of a form of the signal received by said modem comprising:
means supplied with said samples for deriving a succession of angles from said samples;
means for forming the difference between a plurality of pairs of said angles; and
means for testing a plurality of said differences to ascertain whether each tested difference is within a specified range and responsive to said testing to produce a correction value for adjusting said timing.

75. The apparatus of claim 74 wherein selected said differences are averaged to produce said correction value.

76. The apparatus of claim 74 wherein, if testing of said differences indicate the sampling signal is not in good range, further tests are made to establish said correction value.

77. The apparatus of claim 76 wherein if a selected number of differences are within said specified range and at least one is outside of said range, said correction value is set equal to a first average of a selected number of differences within said specified range.

78. The apparatus of claim 76 or 77 wherein under the condition that said selected number of differences are within said specified range and at least one is outside of said range, said correction value may be alternatively set to the value of the sign of a second average of a number of said differences within range multiplied by the difference between a constant and the magnitude of said second average.

79. The apparatus of claim 76 wherein said correction value is set equal to the latest calculated said difference in response to one of said tests.

80. The apparatus of claim 74 or 75 wherein two in-phase samples and two quadrature samples are supplied per baud to said means for deriving and utilized by said means for deriving to derive said angles.

81. The apparatus of claim 80 wherein said means for deriving derives said angles by evaluating the inverse trigonometric function of an argument which is the quotient of two quantities formed from said samples.

82. The apparatus of claim 81 wherein the inverse trigonometric function is:

$$\theta_n = \tan^{-1} \frac{2(X_n X_{n-1} + Y_n Y_{n-1})}{(X_n^2 - X_{n-1}^2) + (Y_n^2 - Y_{n-1}^2)}$$

where $\theta_n$ is the derived angle, $X_n$ is an in-phase sample taken at time "n", $Y_n$ is a quadrature phase sample taken at time "n" and "n−1" indicates the sample taken at the sample time immediately preceding sampling time "n."

83. The apparatus of claim 74 or 75 wherein said pairs of angles are derived from a received clock-only signal.

84. The apparatus of claim 74 wherein said apparatus is applied in initial start-up of the receiver to achieve precise sampling of a transmitted impulse.

85. The apparatus of claim 84 wherein the samples produced by said sampling are supplied to calculating means and used by said calculating means to calculate coefficients for exactly compensating for distortion in the data channel.

86. The apparatus of claim 85 wherein said coefficients are calculated by a non-convergent, iterative process.

87. The apparatus of claim 86 wherein said samples are used to form elements of an N X N matrix and said calculations are performed in N iterations.

88. In a data modem, a method for adjusting the timing of a sampling signal comprising the steps of:
producing a plurality of samples of a form of the received signal;
forming a plurality of angles from said samples;
forming a set of difference values, each difference value comprising the difference between a respective pair of said angles;
testing a plurality of said difference values to ascertain whether each tested difference value is within a selected range; and
producing a correction value in response to the result of said testing.

89. The method of claim 88 wherein said correction value is produced by averaging a plurality of said difference values.

90. The method of claim 88 wherein if one of said tested difference values is outside of the selected range and a plurality of said tested difference values are within the selected range, said correction value is produced by averaging a number of said difference values within the selected range.

91. The method of claim 90 wherein the correction value is set equal to the most recently formed difference value.

92. The method of claim 88 wherein said step of forming further includes the step of producing two in-phase and two quadrature phase samples per baud from the received signal.

93. The method of claim 92 wherein said step of forming further includes utilizing the in-phase and quadrature samples to calculate an inverse trigonometric function.

94. The method of claim 93 wherein said inverse trigonometric function is:

$$\theta_n = \tan^{-1} \frac{2(X_n X_{n-1} + Y_n Y_{n-1})}{(X_n^2 - X_{n-1}^2) + (Y_n^2 - Y_{n-1}^2)}$$

where $\theta_n$ is the derived angle, $X_n$ is an in-phase sample taken at time "n", $Y_n$ is a quadrature phase sample taken at time "n" and "n−1" indicates the sample taken at the sample time immediately preceding sampling time "n."

95. The method of claim 88 including the steps of:
applying said correction value to adjust said sampling signal;
sampling a received impulse response with the adjusted sampling signal; and
calculating equalizer coefficients to compensate for distortion in the data channel from said samples.

96. The method of claim 95 wherein said step of calculating includes the steps of:
calculating elements of an N X N matrix from said samples;
calculating the exact values of said coefficients using said elements in an iterative process of N iterations.

97. The method of claim 96 wherein the elements of said matrix are calculated from in-phase and quadrature samples.

98. The method of claim 96 or 97 wherein said iterative process is non-convergent.

99. Apparatus for initially adapting a data receiver to a communication channel in response to a signal from which impulse response samples may be derived, said signal being followed by transmitted data, said apparatus comprising:

an equalizer means having a plurality of taps, one of said plurality of taps comprising a major tap, said taps being settable to values which compensate for distortion in said communication channel;

means for producing in-phase and quadrature impulse response samples from said signal and exactly calculating said values during the interval between initial receipt of said signal and arrival of transmitted data at said major tap; and means for setting said taps to said values.

100. The apparatus of claim 99 wherein said signal is of a duration substantially equal to the number of symbol intervals of a single received impulse necessary to provide sufficient samples for calculating said values.

101. The apparatus of claim 100 wherein said means for producing produces said samples by sampling said signal once per symbol interval.

* * * * *